(12) United States Patent
Watte et al.

(10) Patent No.: US 9,647,750 B2
(45) Date of Patent: May 9, 2017

(54) OPTICAL FIBRE TEST DEVICE

(75) Inventors: Jan Watte, Grimbergen (BE); Daniel Francois Daems, 'S Gravenwezel (BE); Christiaan Radelet, Aarschot (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 242 days.

(21) Appl. No.: 13/202,445

(22) PCT Filed: Feb. 10, 2010

(86) PCT No.: PCT/EP2010/051623
§ 371 (c)(1),
(2), (4) Date: Aug. 19, 2011

(87) PCT Pub. No.: WO2010/094604
PCT Pub. Date: Aug. 26, 2010

(65) Prior Publication Data
US 2012/0013894 A1    Jan. 19, 2012

(30) Foreign Application Priority Data

Feb. 20, 2009   (EP) .................................. 09153290

(51) Int. Cl.
*G01N 21/00* (2006.01)
*H04B 10/071* (2013.01)
(Continued)

(52) U.S. Cl.
CPC ....... *H04B 10/071* (2013.01); *G01M 11/3109* (2013.01); *G01M 11/3154* (2013.01);
(Continued)

(58) Field of Classification Search
CPC ..... H04B 10/07; H04B 10/071; G01M 11/33; G01M 11/31; G01M 11/3109
(Continued)

(56) References Cited

U.S. PATENT DOCUMENTS 4,823,166 A * 4/1989 Hartog et al. .................. 356/44
5,270,537 A   12/1993 Jacobs
(Continued)

FOREIGN PATENT DOCUMENTS

EP    0145343 A2   6/1985
EP    0432734 A2   6/1991
(Continued)

OTHER PUBLICATIONS

International Preliminary Report on Patentability, issued by the International Bureau of WIPO, Geneva, Switzerland, dated Aug. 23, 2011, for related International Application No. PCT/EP2010/051623; 7 pages.
(Continued)

*Primary Examiner* — Hina F Ayub
(74) *Attorney, Agent, or Firm* — Merchant & Gould P.C.

(57) ABSTRACT

An optical fiber network test device comprising an actuator that is manually operable, without manual handling of optical fibers, firstly to direct light from a light path of the optical network so that test equipment associated with the network can be operated to test the quality of the said light path, and secondly to return the light path to its previous state after completion of the test.

15 Claims, 8 Drawing Sheets

(51) Int. Cl.
*H04B 10/07* (2013.01)
*G01M 11/00* (2006.01)

(52) U.S. Cl.
CPC ............ *H04B 10/07* (2013.01); *G01M 11/31* (2013.01); *G01M 11/33* (2013.01)

(58) Field of Classification Search
USPC ....................................................... 356/73.1
See application file for complete search history.

(56) References Cited

U.S. PATENT DOCUMENTS

| | | |
|---|---|---|
| 5,649,036 A | 7/1997 | Anderson et al. |
| 5,742,715 A * | 4/1998 | Boehlke et al. ................. 385/32 |
| 6,317,535 B1 | 11/2001 | Jennings et al. |
| 2003/0030787 A1* | 2/2003 | Beller ................. G01M 11/3109 356/73.1 |
| 2008/0068586 A1* | 3/2008 | Kishida et al. ................. 356/32 |
| 2009/0263123 A1* | 10/2009 | Zhu et al. ....................... 398/16 |

FOREIGN PATENT DOCUMENTS

| | | |
|---|---|---|
| WO | WO 98/14766 A1 | 4/1998 |
| WO | WO 2007/010182 A1 | 1/2007 |

OTHER PUBLICATIONS

International Search Report and Written Opinion issued by the European Patent Office, dated May 12, 2010, for PCT/EP2010/051623; 11 pages.

* cited by examiner

OPTICAL FIBRE TEST DEVICE

This invention relates to an optical fibre network test device for use in testing the quality of light paths within an optical fibre network. It will be understood herein that the expression "light path" is not necessarily restricted to transmission of electromagnetic radiation in the visible light range.

Optical fibre monitoring methods today are well established to allow for testing of a fibre optic link using various kinds of optical time domain reflectometer (OTDR) and these have been widely adopted for checking the quality of long distance fibre links. With the increasing deployment of fibre to the home (FTTH) there is a growing need for low-cost monitoring methods to check the quality of fibre links within a highly branched network. It is known from WO 2007/096584 of Tyco Electronics Raychem NV for a technician who is installing an optical fibre drop cable from the main fibre loop to a subscriber's home to test the quality of the drop cable light path by manually placing the drop cable fibre against the end of a suitably prepared stub fibre which reflects a test signal from the system back along the fibres for detection and quality assessment by the aforementioned OTDR or other test equipment to confirm acceptable signal quality in the drop cable fibre before completion of the drop cable installation. The installing technician of course has the necessary skills to manipulate the delicate optical fibres for the purposes of this test. In the absence of the technician when it is later desired to test for faults within a highly branched passive optical network, the test pulse which is injected into the fibre from the central office of a telecommunications systems is reflected back to different extents from all the different network branches, making it very difficult for the central office OTDR equipment to identify which reflection is coming from which network branch.

The present invention addresses this difficulty and provides an optical fibre network test device comprising an actuator that is manually operable, without manual handling of optical fibres, first to direct light from a light path of the optical network so that test equipment associated with the network can be operated to test the quality of the said light path, and secondly to return the light path to its previous state after completion of the test.

It will be appreciated that a test device according to this invention which does not require skilled manual handling of optical fibres, has the great advantage that it can be operated by a subscriber in the absence of any trained technician, to enable the test equipment to test the light path leading to that particular subscriber. However the test device of this invention may also be advantageously deployed elsewhere in the network for simplifying operation by the system technicians. The actuator of the test device according to the invention could be any simple mechanical member such as a lever, slide, crank, pulley, or preferably a push button or similar device.

In preferred embodiments of the invention, the actuator is operable firstly to introduce into the said light path a test light-directing means that directs light from the light path to the said test equipment, and secondly to remove the test light-directing means from the said light path. It is preferred that the test light-directing means be a reflector, although prisms, diffraction gratings or other light-directing means could also be used.

It is particularly preferred that the actuator is associated with a housing that encloses the test reflector or other light-directing means together with a part of the said light path into which the test reflector or other light-directing means is operatively introduced. Such an enclosing housing advantageously reduces the risk of introducing dirt or damage that would detract from the quality of the light path.

In particularly convenient forms of this invention, part of the said light path traverses free space, for example between collimating lenses at the opposed ends of two lengths of optical fibre, and the actuator is arranged to introduce the test reflector or other light-directing means into that free space part of the light path. It is theoretically possible to separate two end-two-end optical fibres which have virtually no free space between them, and to place a reflector or other light-directing means opposite one or other of the fibre ends thus exposed, but this is likely to be much less convenient than the above free space arrangement.

In further preferred embodiments of this invention, the actuator is operable to place the test reflector or other light-directing means in the light path selectively in at least two different positions or orientations for testing different parts of the light path, or for directing light from the light path selectively to different test equipments. This selective placement can advantageously be used to test the system part and the subscriber part of the network.

The test device may if desired be arranged to place dual reflectors or other light-directing means in the light path so as to test simultaneously the upstream and downstream portions of the light path, usually the system portion and the subscriber portion of the light path respectively.

In alternative versions of this invention, the actuator may be arranged to bend an optical fibre so as to cause significant bending loses of the optical signal, which can be compared with the unbent signal for testing purposes. This may advantageously be effected using hole-arranged photonic crystal fibre (HA-PCF) which can be bent to a radius as low as 5 mm without significant loss of light. The actuator can then press on the bent portion of such a fibre to force it past the 5 mm bend limiting radius, thus causing large bending loses of signal for testing aforesaid. The bent part of the HA-PCF will preferably be embedded in a flexible material that relaxes to its original state, thus restoring the signal-conducting quality of the fibre after the actuator is removed.

The test device of this invention is particularly useful when provided at a demarcation point separating responsibility for different parts of the aforementioned light path, especially at the demarcation point between the system and the subscriber responsibility in a telecommunications network. Preferably the test device will be installed inside the customer premises for convenient operation by the customer, usually at, or incorporated in, the wall box or plug where the system fibre enters the subscriber's premises. The use of this device for customer actuation of a test without requiring costly attendance of a technician (no "truck roll") is especially advantageous for determining whether a given fault is in the system side or the subscriber side of the network.

In preferred embodiments of this invention, test equipment may be provided together with, preferably integrated in, the test device, for example within the test device actuator housing.

Persons skilled in the relevant technology will be able to construct suitable actuators and housings and other parts for making the devices of this invention, for example by moulding of engineering plastics, or by other well known fabricating techniques and materials.

Specific embodiments of this invention will now be described by way of example, with reference to the accompanying schematic drawings, wherein.

Figure 7:
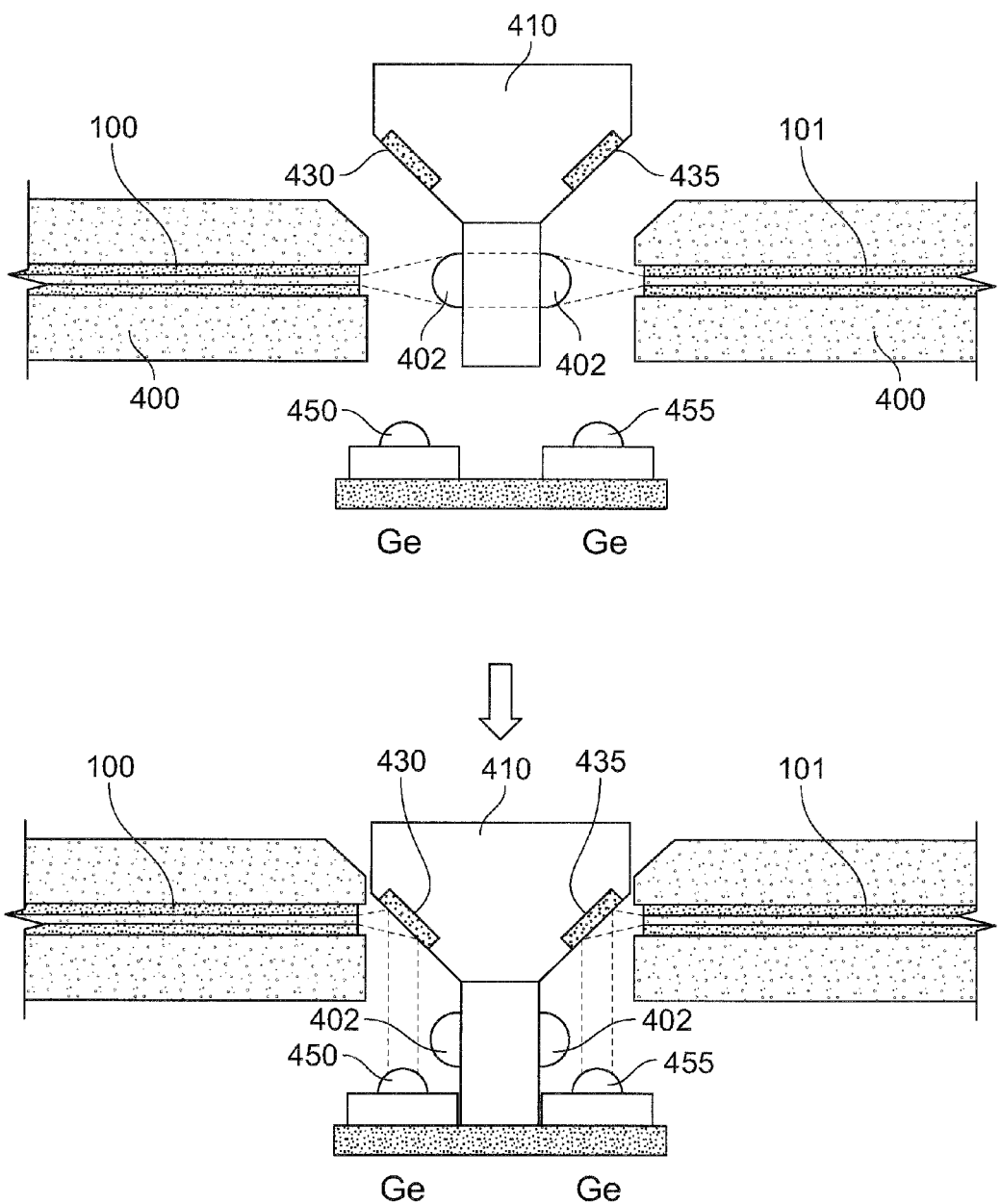
Figure 8:
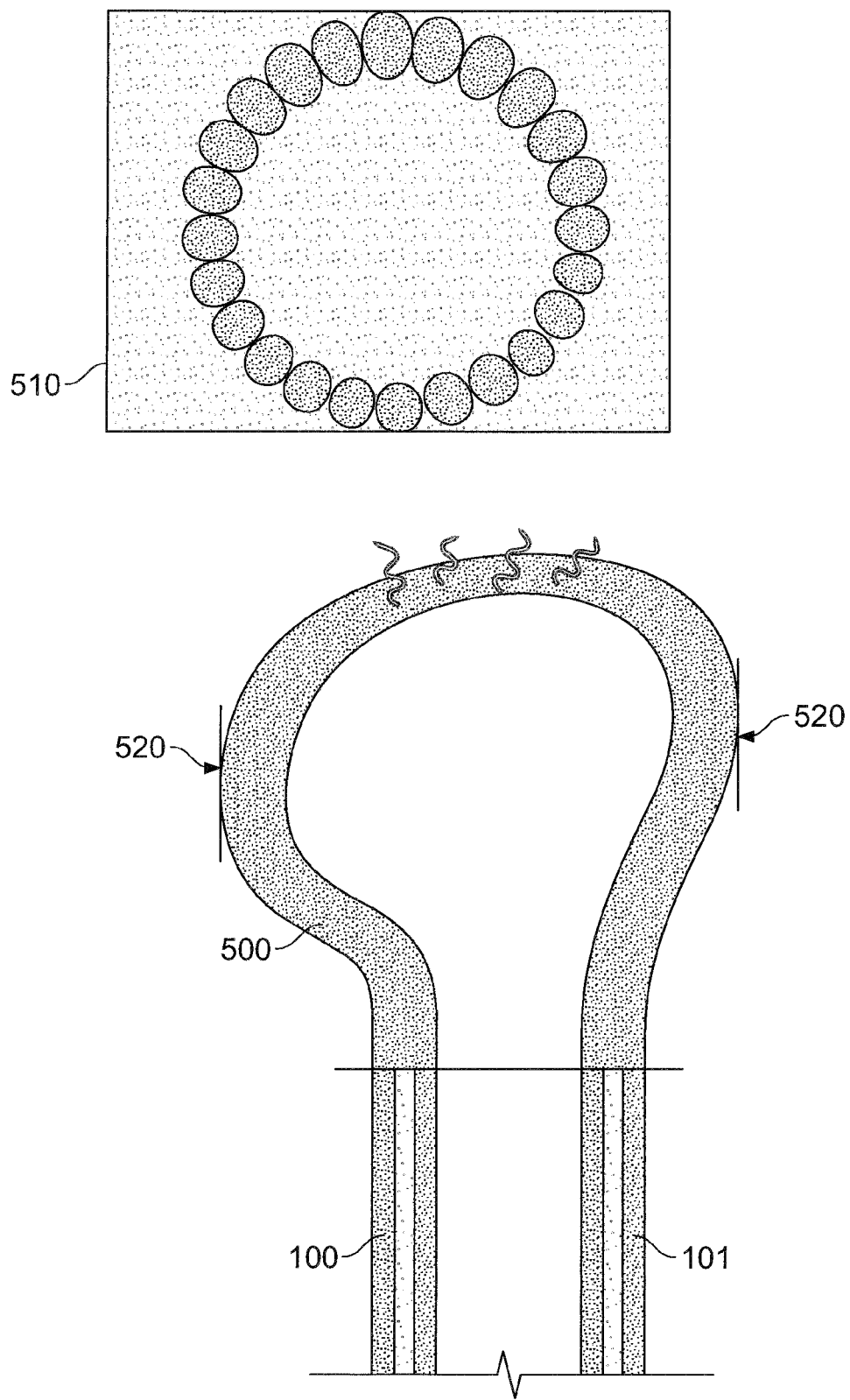

FIG. 7 shows another embodiment of the invention in which collimating lenses attached to the actuator are moved out of the light path and reflective mirrors are moved into the light path to reflect light coming from either end of the opposed optical fibres into collimating lenses on respective ones of a pair of detectors arranged opposite the actuator; and FIG. 8 shows an alternative approach to the test device of this invention in which a hole-arranged photonic crystal fibre is bent by pressure of the actuator to cause light losses from the fibre which can be used for comparative testing before and after such bending.

Figure 1:
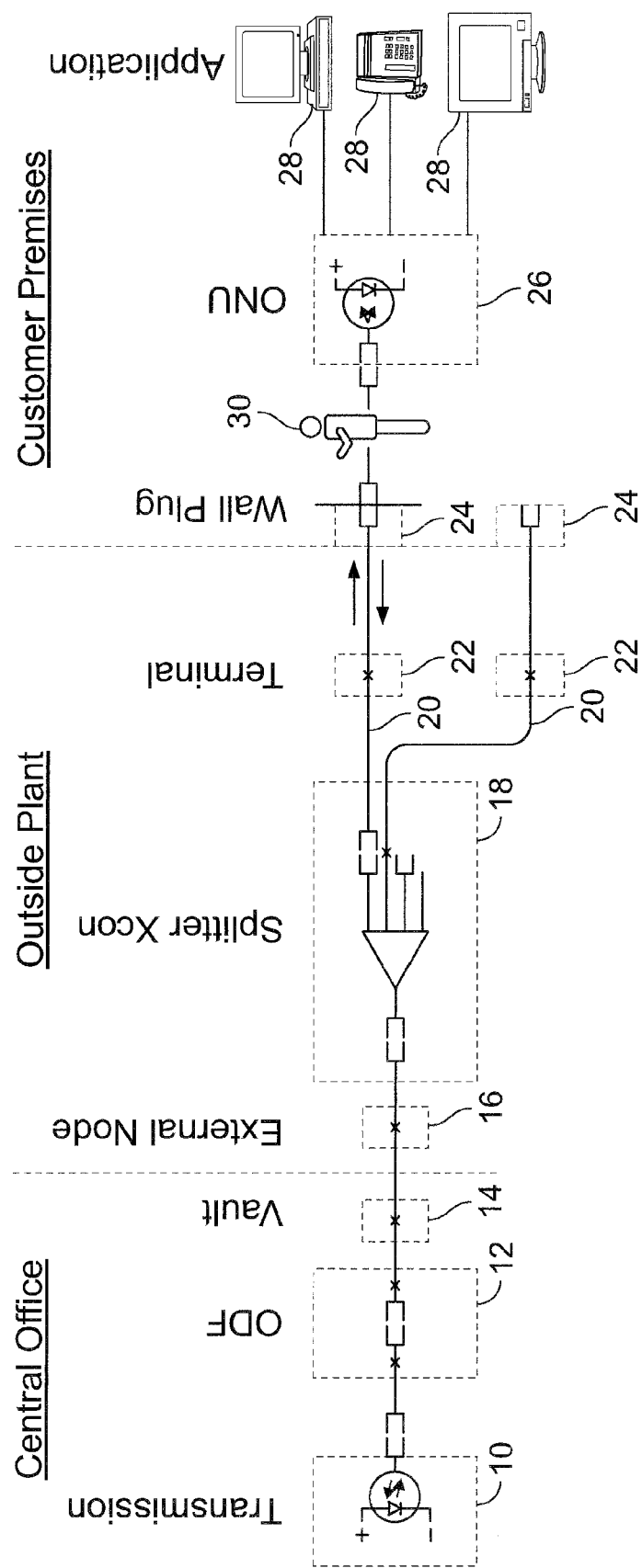
FIG. 1 shows the principles of a branched passive optical network in a telecommunications system.

Referring now to FIG. 1 of the drawings, the principles of remote optical testing in a passive optical network are illustrated by a central office in which transmission equipment 10 sends optical signals through fibres leading to an optical distribution frame 12 and then through a vault 14 into an outside plant external node 16 from which fibres lead to a set of splitters 18 which divide the signals amongst various ongoing fibres 20 via terminals 22 to respective subscriber or customer premises via wall plugs 24 to which the subscriber's equipment 26, 28 is connected in known manner. When a subscriber has a problem with the service, it is important to be able to identify, locate and solve the problem as fast as possible and at the lowest possible cost. Unnecessary technician interventions ("truck rolls") are a significant waste of cost and technician time for telecoms system operators if not managed well. As previously mentioned, traditional OTDR testing from the central office is unsatisfactory in highly branched passive optical networks owing to the multitude of reflections from all the different network branches. The principal of the present invention is to enable the subscriber, indicated by the human figurine 30, safely to induce a known reflection, usually a strong reflection, which will be identifiable to enable the central office to determine where the fault is located. Preferably, the test device according to the present invention will be incorporated in the wall plug or wall box at the customer premises which is the demarcation point between the system responsibility for the optical network and the customer responsibility for his part of the optical network leading to his equipment. The central office operator can then determine whether the fault is located before or after the optical demarcation point, thus supporting the decision whether to send a technician or not, and at whose cost a potential intervention or repair will be made.

Figure 2:
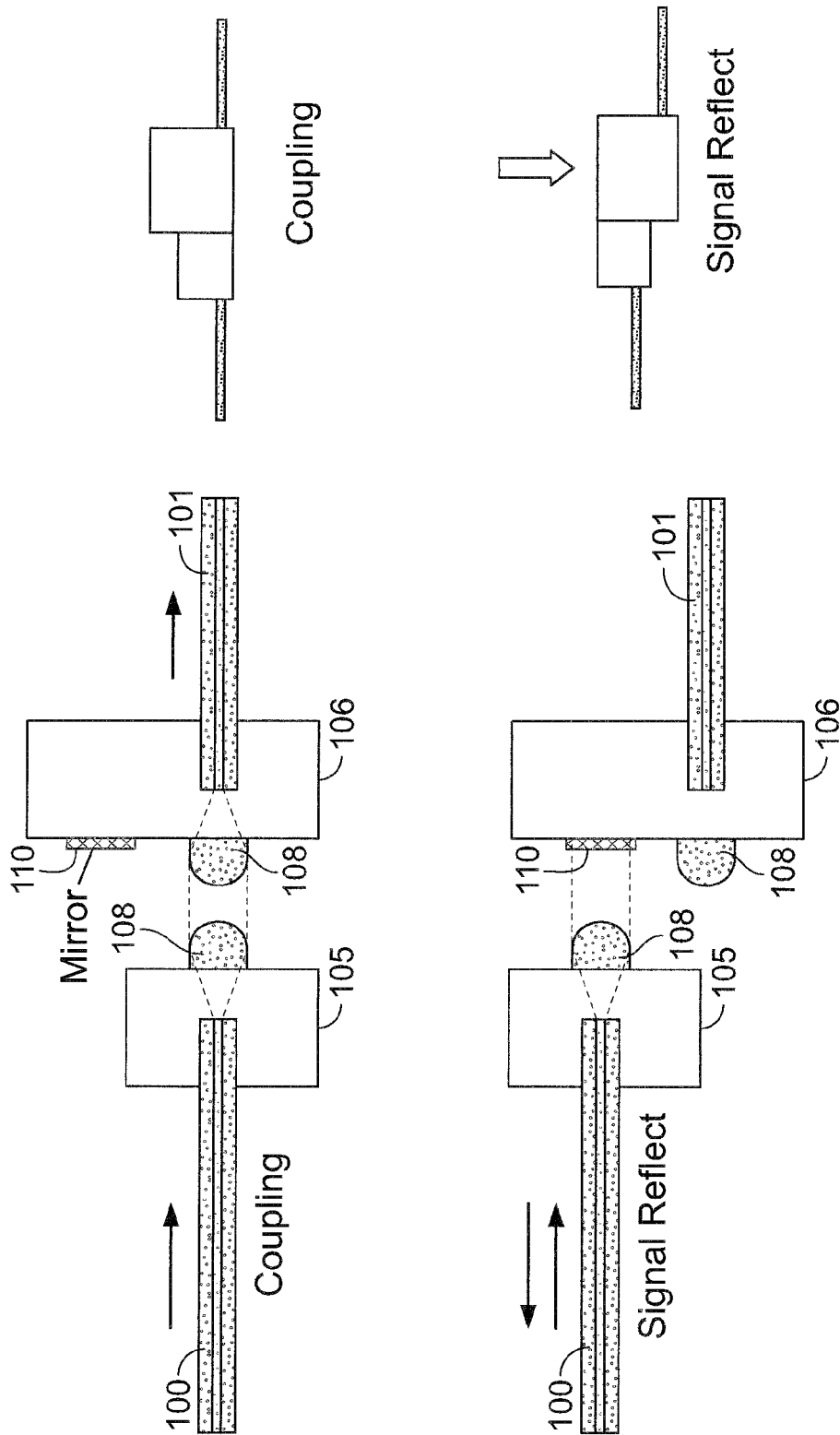
FIG. 2 shows a first embodiment of the present invention where an actuator moves a mirror into the light path for testing purposes.

FIG. 2 shows schematically a first embodiment of the present invention wherein optical fibres 100, 101 are coupled through coupling blocks 105, 106 and collimating lenses 108 provided by any known or convenient method. The coupling block 106 serves as the actuator according to the present invention as shown in the lower drawing of FIG. 2, where the coupling block 106 has been depressed to move the collimating lenses 108 out of alignment with each other and to place a mirror 110 in the light path coming from optical fibre 100, so as to reflect light back down that fibre 100 to be detected by test equipment as aforementioned. The coupling blocks 105, 106 may be mounted in suitable housing (not shown) designed in any convenient way to allow the necessary movement of coupling block 106.

Figure 3:
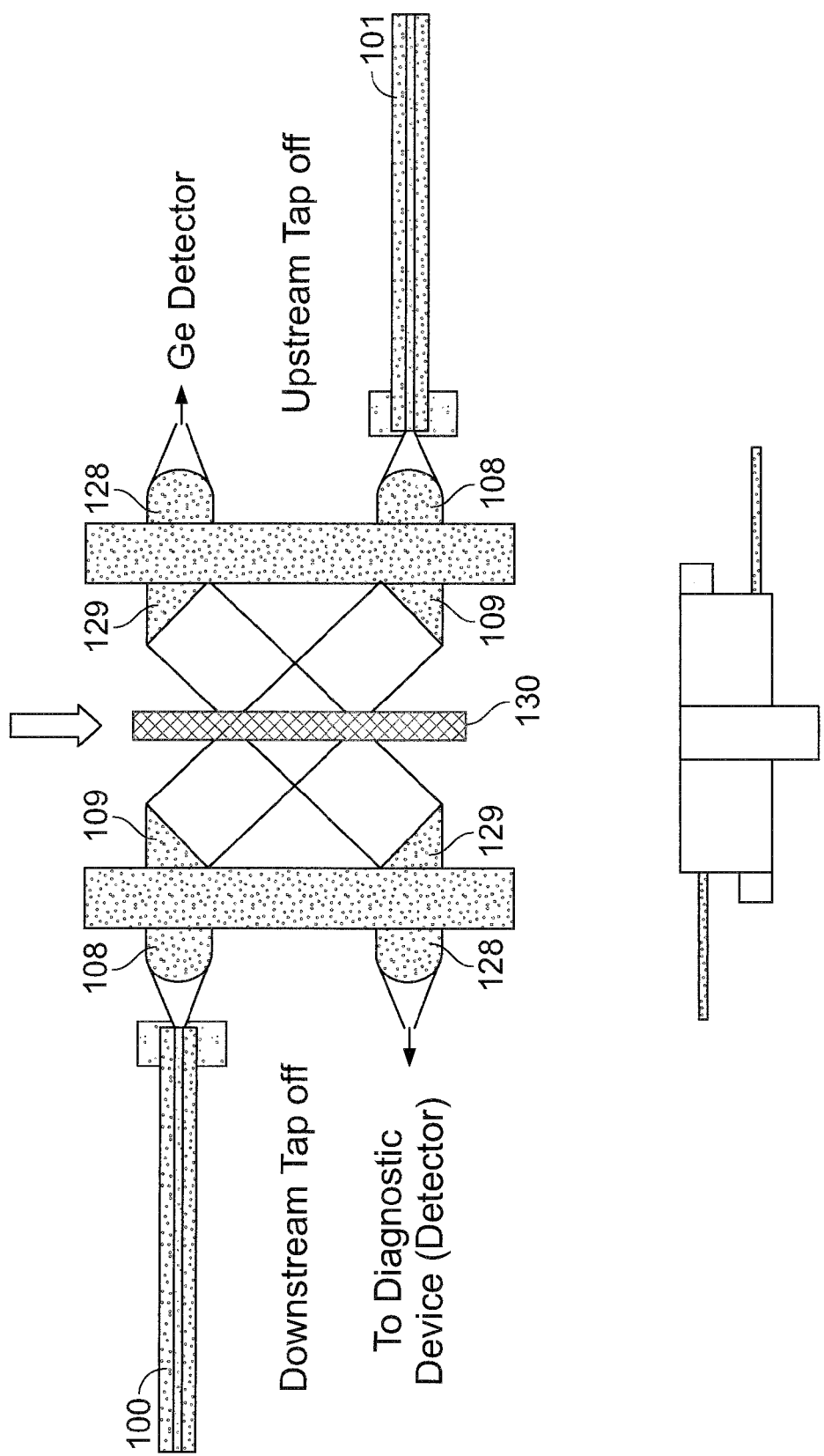
FIG. 3 shows another embodiment of the invention in which a mirror is movable into and out of the free space in the light path between lenses prisms which project the light path through the free space.

FIG. 3 shows another embodiment of the invention, in which optical fibres 100 and 101 are optically coupled together by collimating lenses 108 and prisms 109, and the test actuator is arranged to move a mirror 130 into the free space of the light path between the prisms 109, so that the mirror reflects the light coming from optical fibre 100 downwards towards a receptor prism 129 and then via a collimating lens 128 to a diagnostic device (not shown). Similarly, the mirror reflects light coming from the optical fibre 101 upwards into another receptor prism 129 and collimating lens 128 to send that light to another diagnostic detector device (not shown). The mirror may be a 100% reflecting mirror or a wavelength-selective reflector. The respective ends of the fibres 100 and 101 will be cleaved and/or polished as known per se and butt against a stop in alignment with the respective collimating lenses 108.

Figure 4:
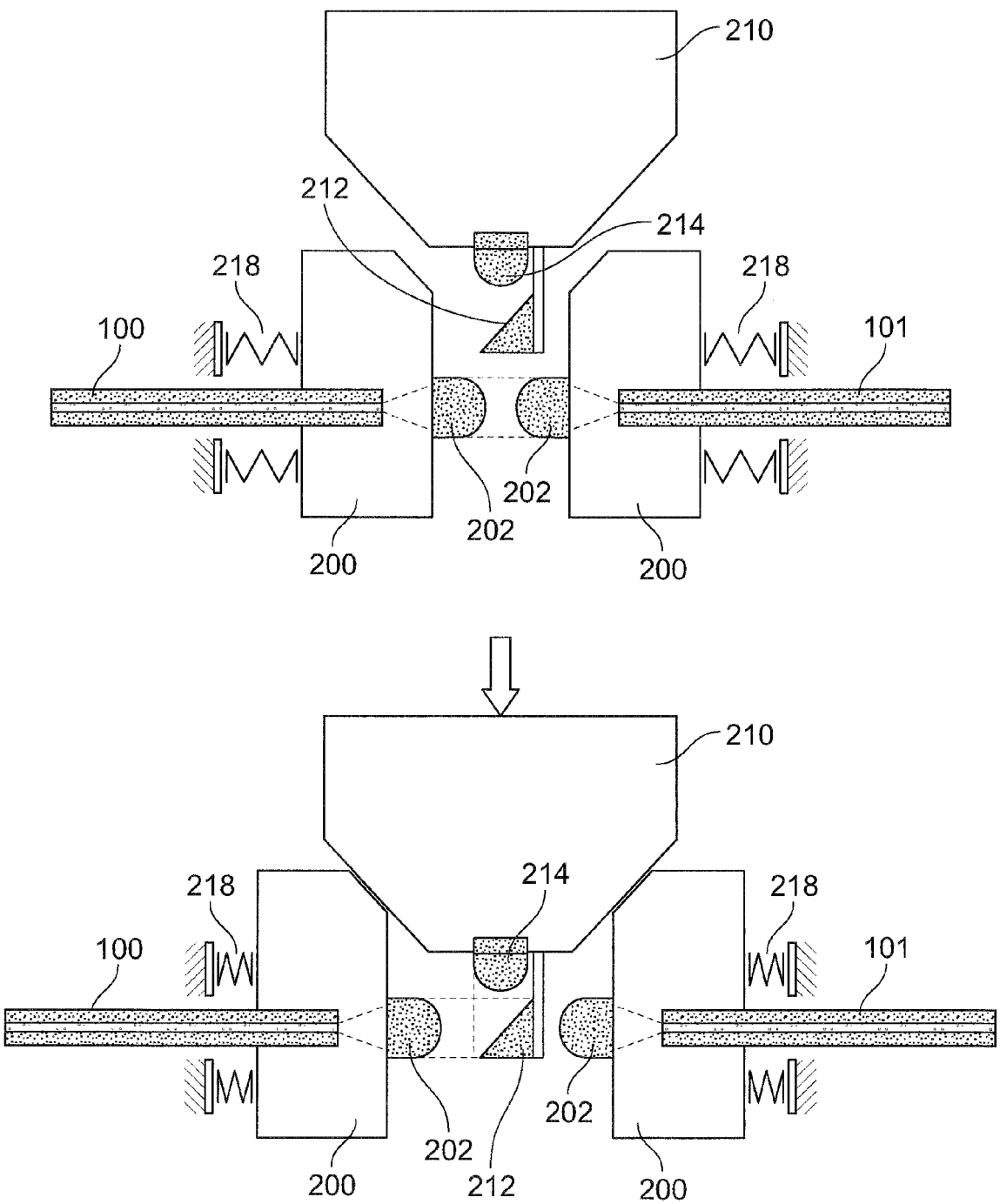
FIG. 4 shows another embodiment of the invention in which a diagnostic device and electronic read out are incorporated in the actuator which inserts a mirror into the free space between the collimating lenses.

FIG. 4 shows another embodiment of the invention where the actuator 210 incorporates a battery-powered diagnostic device and electronic read out to measure the coupling loss through the collimating lenses 202, compared with the known signal strength transmitted by the central office. When the actuator 210 is depressed as shown in the lower view of FIG. 4, it slightly separates the termination blocks 200 against the restoring force of schematically shown springs 218, and inserts the reflective prism or mirror 212 between the lenses 202 to reflect the light coming from optical fibre 100 into the lens 214 of the actuator and then to the incorporated diagnostic device (not shown). The springs 218 may be of any convenient type, or the resilient movement of the termination blocks 200 could be provided by suitably designed flexible housings for the test device. It may also be possible to place the terminals blocks 200 sufficiently far apart so that no further separation of the blocks 200 is required in order to admit the reflector 212 between the lenses 202. When the actuator 210 is released, it returns to the initial position shown in the upper view of FIG. 4 and the transmission blocks 200 and lenses 202 resumes their original position.

Figure 5:
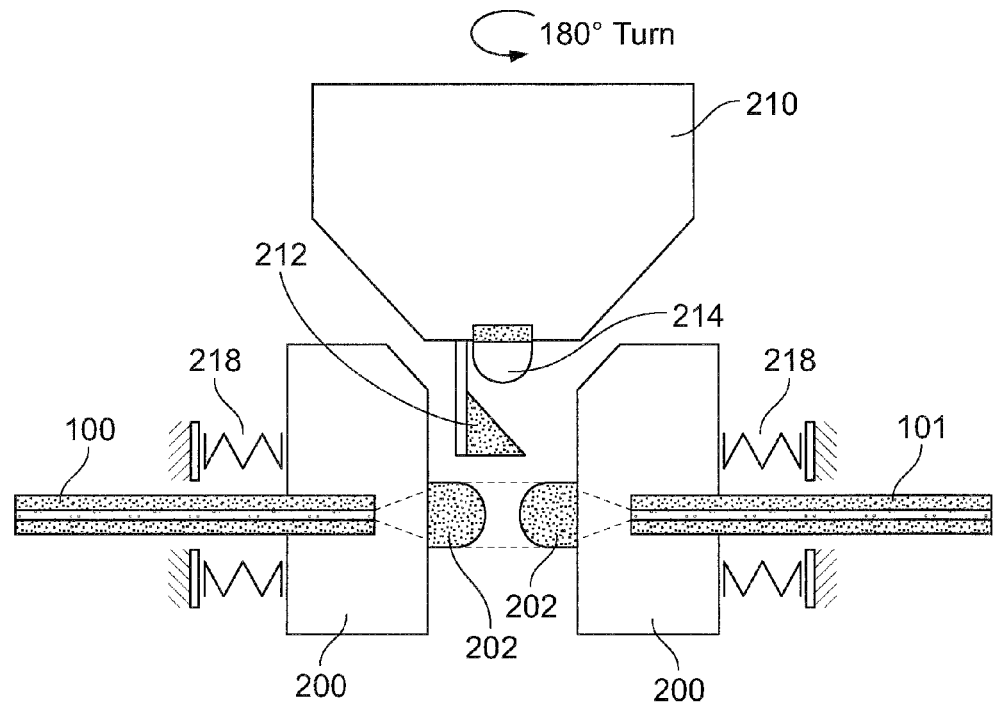
FIG. 5 shows a further development of the test device shown in FIG. 4 in which the actuator is turnable through 180° to test the light path coming from either one of the collimating lenses.
Figure 5:
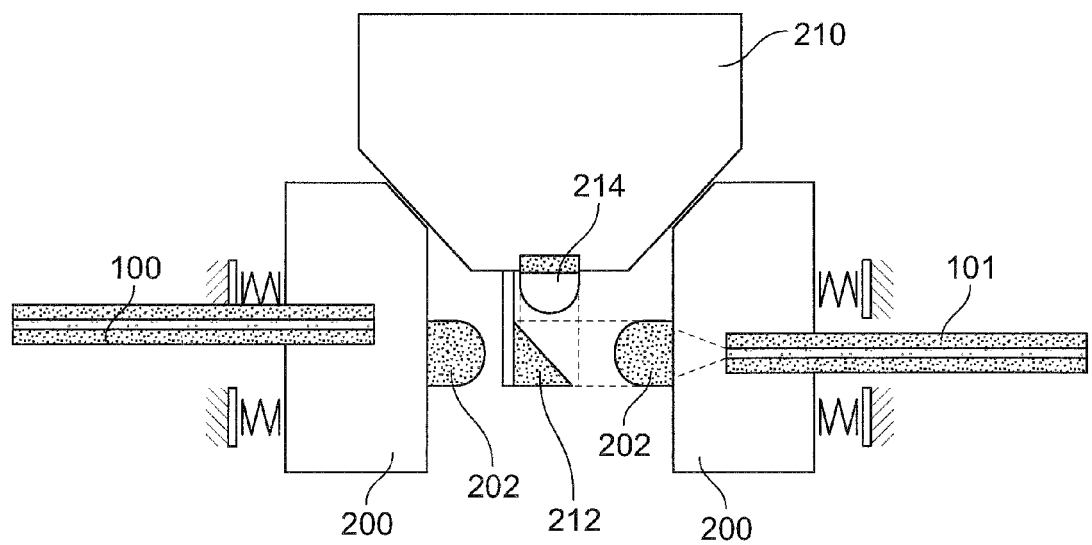

FIG. 5 shows a preferred form of the test device shown in FIG. 4, wherein the actuator 210 is capable of turning 180° in order to insert the reflector 212 facing in the opposite direction from FIG. 4 between the lenses 202, thus to reflect the light coming from the other optical fibre 101 into the lens 214 of the actuator and hence to the incorporated diagnostic device. This enables both sides of the optical circuit to be tested by simple operation of the actuator, which can be done by the subscriber without risking damage or contamination of the fibres or lenses.

Figure 6:
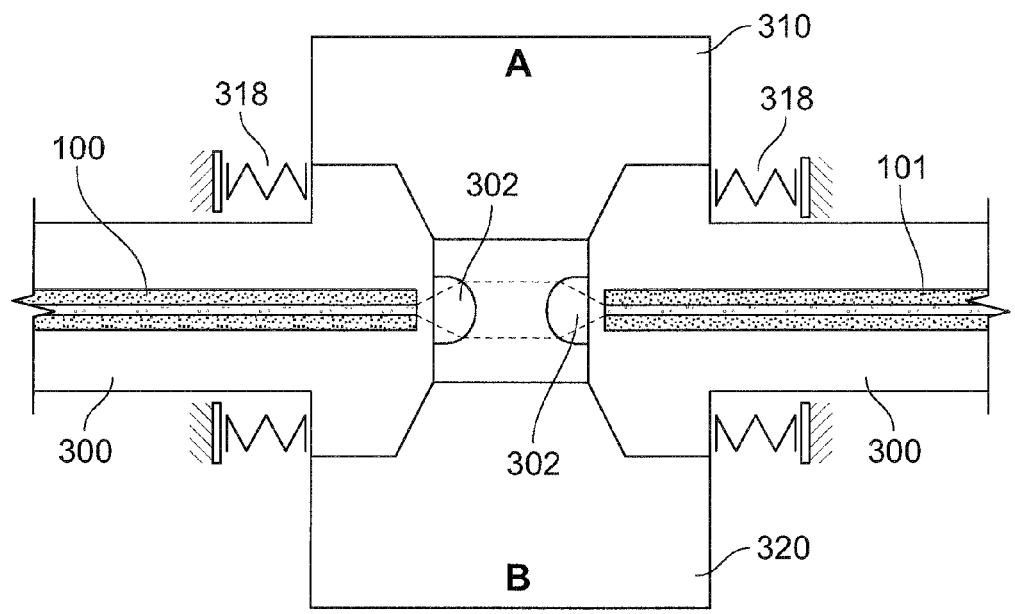
FIG. 6 shows another embodiment of the invention in which an angled pair of mirrors is inserted into the light path between the collimating lenses to reflect light coming from each of the collimating lenses to a respective one of a pair of diagnostic detectors incorporated in the device opposite the actuator.
Figure 6:
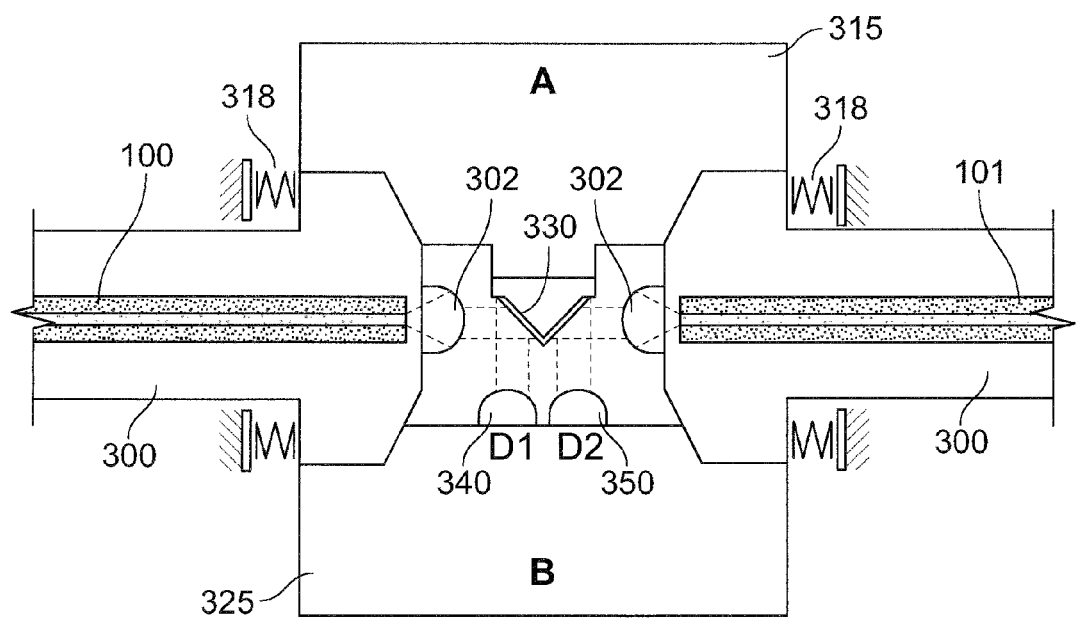

FIG. 6 shows a somewhat different design in which the optical fibres 100, 101 are held within hammer-shaped termination blocks 300 positioned between upper and lower parts 310 and 320, with light passing between the fibres 100, 101 via collimation lenses 302. The lower view of FIG. 6 shows the upper part 310 replaced by an actuator according to the present invention having a V-shaped reflector 330 which has been pushed downwards (in the illustrated view) between the collimation lenses 302. The mirror 330 thus reflects the light coming from optical fibre 100 downwards into a receptor lens 340, and the light coming from optical fibre 101 downwards into a receptor lens 350, which lenses transmit the reflected light to diagnostic detectors incorporated within the lower part 325, which can thus produce a test readout for both sides of the network at a single depression of the actuator 315.

FIG. 7 shows another alternative embodiment of this invention, in which the actuator 410 carries collimation lens 402 that transmit light between the two fibres 100, 101. When the actuator 410 is depressed as shown in the lower view of FIG. 7, it removes the collimating lenses 402 from the light path and inserts mirrors 430, 435 carried by the actuator 410 into the light path, so that light from fibre 100 is reflected down to a collimation lens 450 of a detector associated with this test device and the light from fibre 101 is reflected by mirror 435 down into another collimation lens 455 of a separate detector included in the device.

FIG. 8 shows a different alternative of the invention wherein the light path between optical fibres 100 and 101 includes an optical fibre, preferably a hole-arranged photonic crystal fibre as indicated in schematic cross section 510, which may be bent beyond its minimum bend radius by the actuator pressure applied in the direction of arrows 520 to cause significant loss of light from the bent fibre 500 for test comparisons to be made between the original transmissive state of the fibre 500 and its over-bent loss state. Hole-arranged photonic crystal fibres are preferred because of their low minimum bend radius down to as little as 5 mm, which makes for convenient incorporation into a relatively small test device. The optical fibre in this embodiment will preferably be embedded in a flexible material that recovers to its original state when the actuator pressure is removed.

The invention claimed is:

1. An optical fibre test device comprising:
   a housing within a wall plug or wall box;
   a first light directing device enclosed within the housing; and
   a manually operable actuator coupled to the first light directing device, the manually operable actuator configured to move the first light directing device between a testing position and a non-testing position,
   wherein the testing position of the first light directing device interrupts an active optical transmission path between a first optical fibre and a second optical fibre, wherein the interruption of the active optical transmission path occurs without manual handling of the first and second optical fibres, and wherein the testing position of the first light directing device enables the first light directing device to direct the light transmitted through at least one of the first and second optical fibres to an optical detector, and
   wherein the non-testing position of the first light directing device re-establishes the active optical transmission path between the first and second optical fibres, and wherein the re-establishment of the active optical transmission path occurs without manual handling of the first and second optical fibres.

2. The optical fibre test device according to claim 1, wherein the light directing device is a reflector, prism, or diffraction grating.

3. The optical fibre test device according to claim 1, wherein the housing additionally encloses a part of the active optical transmission path between the first and second optical fibres.

4. The optical fibre test device according to claim 1, wherein a part of the active optical transmission path between the first and second optical fibres includes free space and wherein the interruption of the active optical transmission path by the first light directing device occurs in that free space.

5. The optical fibre test device according to claim 1, further comprising a second light directing device enclosed within the housing, the manually operable actuator additionally coupled to the second light directing device and additionally configured to move the second light directing device between the testing position and the non-testing position, and wherein the testing position places the first and second light directing devices in two different positions within the active optical transmission path and enables the first and second light directing devices to direct the active light transmitted through at least one of the first and second optical fibres to first and second optical detectors, respectively.

6. The optical fibre test device according to claim 1, further comprising a second light directing device enclosed within the housing, the manually operable actuator additionally coupled to the second light directing device and additionally configured to move the second light directing device between the testing position and the non-testing position, wherein the testing position places the first and second light directing devices in the active optical transmission path and simultaneously enables the first light directing device to direct the active light transmitted through the first optical fibre to a first optical detector and the second light directing device to direct the active light transmitted through the second optical fibre to a second optical detector.

7. The optical fibre test device according to claim 1, wherein the manually operable actuator is a push button or similar linear-action member.

8. The optical fibre test device according to claim 1, which is located together with or incorporates test equipment to give a test reading at the point of actuation of the device.

9. The optical fibre test device according to claim 8, wherein the said test equipment is attached to or incorporated in the housing or actuator of the test device.

10. The optical fibre test device according to claim 1, wherein the wall plug or wall box are located at a customer premises.

11. A method of testing an optical fibre having an active light source, the method comprising the steps of:
   positioning a light directing device, that is enclosed by a housing located within a wall plug or wall box, in an active optical transmission path that exists between a first optical fibre and a second optical fibre through manual activation of an actuator coupled to the light directing device, the positioning occurring without manual handling of the first and second optical fibres;
   directing, with the light directing device, the active light being transmitted in at least one of the first and second optical fibres to an optical detector;
   detecting, with the detector, the directed light to determine a quality of the directed light;
   removing the light directing device from the active optical transmission path; and re-establishing the active optical transmission path between the first and second optical fibres by repositioning the light directing device away from the optical transmission path through manual activation of the actuator.

12. The method of claim 11, wherein the light-directing device is provided as a reflector, prism, or diffraction grating.

13. The method of claim 11, wherein a part of the active optical transmission path includes free space and wherein positioning the light-directing device comprises positioning the light directing device in that free space.

14. The method of claim 13, wherein the light directing device comprises at least two light directing devices and wherein the step of positioning further comprises positioning the at least two light directing devices in the active optical transmission path in at least two different positions within the optical transmission path, and wherein the step of directing further comprises directing, with each of the at least two light directing devices, the active light being transmitted in at least one of the first and second optical fibres to first and second optical detectors, respectively.

15. The method of claim 11, wherein the wherein the wall plug or wall box are located at a customer premises.

* * * * *